United States Patent

Matsuura et al.

[11] Patent Number: 5,229,790
[45] Date of Patent: Jul. 20, 1993

[54] LASER PRINTER WITH PARAMETER SWITCHING IN ACCORDANCE WITH SCANNING DENSITY

[75] Inventors: Tomoyuki Matsuura; Hideki Furuta, both of Saitama, Japan

[73] Assignee: Fuji Xerox Co., Ltd., Tokyo, Japan

[21] Appl. No.: 666,514

[22] Filed: Mar. 7, 1991

[30] Foreign Application Priority Data

Mar. 9, 1990 [JP] Japan ................... 2-56470

[51] Int. Cl.⁵ .............................. H04N 1/21
[52] U.S. Cl. .................................. 346/108
[58] Field of Search ............ 346/108, 107 R, 160

[56] References Cited

U.S. PATENT DOCUMENTS

| | | | |
|---|---|---|---|
| 4,347,523 | 8/1982 | Ohara | 346/108 |
| 4,373,801 | 2/1983 | Itoh | 219/216 |
| 4,465,370 | 8/1984 | Yuasa et al. | 356/224 |
| 4,528,689 | 3/1986 | Spencer et al. | 346/160 |
| 4,727,382 | 2/1988 | Negishi et al. | 346/108 |
| 4,920,250 | 4/1990 | Urban | 355/285 |
| 5,006,705 | 4/1991 | Saito et al. | 346/108 |
| 5,053,619 | 10/1991 | Arimoto | 346/108 |
| 5,055,855 | 10/1991 | Nishio | 346/1.1 |

FOREIGN PATENT DOCUMENTS 0183166  6/1986  European Pat. Off.
64-86180  3/1989  Japan

*Primary Examiner*—Mark J. Reinhart
*Attorney, Agent, or Firm*—Finnegan, Henderson, Farabow, Garrett & Dunner

[57] ABSTRACT

A laser beam printer which forms a latent electrostatic image on a photoreceptor with a laser beam to perform an image recording operation, including scanning density switching means for selectively switching a scanning density of the laser beam on the photoreceptor within a plurality of values, and parameter switching means for selectively switching a parameter other than the scanning density of the laser beam within a plurality of values in the steps of producing a print. The parameter is, for example, a quantity of the laser beam, a width of the laser beam for one pixel in the main scan direction, or the like. A switching operation of the parameter switching means is controlled in accordance with a value of the scanning density selected by the scanning density switching means.

11 Claims, 5 Drawing Sheets

LASER PRINTER WITH PARAMETER SWITCHING IN ACCORDANCE WITH SCANNING DENSITY

BACKGROUND OF THE INVENTION

This invention relates to a laser beam printer that is adapted to perform image recording with a laser beam by using electrophotography as a method of forming a latent electrostatic image.

Laser beam printers are capable of recording sharp image at fast speed without making annoying noise which is a major defect of dot printers. Because of these advantages, laser beam printers are gaining increasing acceptance as office machines and in other areas. The operating principle of laser beam printers is to form a latent electrostatic image on a photoreceptor, which is developed in a developing unit to form a toner image that corresponds to the characters or images to be recorded. The toner image is then transferred onto a recording sheet and fused thereto to be ejected from the machine.

Conventional laser beam printers have single scanning densities of their own, mostly 300 dpi (dots per inch) or 400 dpi. The reason why each conventional laser beam printer has only one scanning density is that it is supposed to be used in association with a specific information processor such as a host computer or work station. If a certain information processor is set to handle image information of 300 dpi, the laser beam printer to be connected to that processor need have a scanning density of 300 dpi. On the other hand, if the information processor is set to handle image information of 400 dpi, the laser beam printer to be connected to that processor need have a scanning density of 400 dpi.

FIG. 7 shows how a conventional laser beam printer connected to a host computer operates. In FIG. 7, a laser beam printer 191 comprises a laser scanning unit 192 and a control unit 193 which controls the scanning unit. A host computer 194 is an information processor that supplies text information to the laser beam printer, and the host computer is connected to the control unit 193. In the laser beam printer 191, the scanning unit 192 has a crystal oscillator 196, and the control unit 193 has a crystal oscillator 197. Suppose here that the host computer 194 sends image information of 300 dpi. In this case, the crystal oscillator 196 in the laser scanning unit 192 which operates in synchronism with the rotation of a built-in polygonal mirror (not shown) generates a clock signal that permits a laser beam to scan a photoreceptor (also not shown) at a scanning density of 300 dpi. On the other hand, the crystal oscillator 197 in the control unit 193 will generate a clock signal for processing image information of 300 dpi sent from the host computer 194.

The recent advances in the technology of integrating office machines as accompanied by the development of information processing systems have been remarkable and this has not only led to the introduction of a new information processor such as an "engineering workstation" but also enabled data exchange between a plurality of information processors interconnected on a network. Under these circumstances, there has arisen the possibility that a reading machine that incorporates image information having a scanning density of, say, 400 dpi is used in combination with a text editing machine that handles font information having a different scanning density of, say, 300 dpi. As regards reading machines, standards specified by the C.C.I.T.T. (the Consultative Committee for International Telegraph and Telephone) including the resolution of facsimiles in group G4 have made it common these days for reading machines to incorporate image information of 400 dpi. On the other hand, in the case of text editing systems of the type shown in FIG. 7, printers that perform recording at a scanning density of 300 dpi have now gained wide acceptance, particularly because fonts adapted for 300 dpi are extensively used in word processors and personal computers in both the U.S. and European countries. In this situation, information processors or networks that handle both image and text information may potentially require that laser beam printers perform recording at two scanning densities, say, 300 dpi and 400 dpi.

While the possibility of using different scanning densities has been discussed above with reference to two values, 400 dpi and 300 dpi, this is not the sole case that can be considered. Whichever scanning densities are selected, no single conventional laser beam printers have been capable of dealing with two, three or even more scanning densities if they are to be used in combination. It has therefore been necessary to provide separate printers that are to deal with the respective scanning densities.

However, the use of separate laser beam printers for respective scanning densities not only results in an expensive recording system but also requires an extra space for printer installation.

SUMMARY OF THE INVENTION

The present invention has been achieved under these circumstances and has as an object providing a laser beam printer which is capable of dealing with a plurality of scanning densities even if it is used in a single unit.

A laser beam printer according to the present invention comprises: a photoreceptor; latent image forming means for forming a latent electrostatic image on the photoreceptor by irradiating a laser beam to the photoreceptor; developing means for developing the latent electrostatic image on the photoreceptor; transfer means for transferring the resulting toner image onto a sheet; fusing means for fusing the transferred toner image on the sheet to produce a print; scanning density switching means for selectively switching a scanning density of the laser beam on the photoreceptor within a plurality of values; parameter switching means for selectively switching a parameter other than the scanning density of the laser beam within a plurality of values in the steps for producing the print; and control means for controlling a switching operation of the parameter switching means in accordance with a value of the scanning density selected by the scanning density switching means.

BRIEF DESCRIPTION OF THE DRAWINGS

FIGS. 1 through 6 serve to illustrate an embodiment of the present invention, in which:

FIG. 1 is a block diagram showing the essential part, including a control unit, of the circuit configuration of a laser beam printer;

FIG. 2 is a schematic diagram of the laser beam printer;

FIG. 3 is a block diagram showing an outline of the electric circuit portion of the laser beam printer;

FIG. 4 is a block diagram showing an outline of the laser beam printer as connected to a host computer;

FIG. 5 is a flowchart for the control of printing with the laser beam printer; and FIG. 6 is a characteristic diagram showing the relationship between scanning density and various laser parameters.

DETAILED DESCRIPTION OF THE PREFERRED EMBODIMENT

The present invention will be described below in detail with reference to the preferred embodiment shown in FIGS. 1 through 6.

Outline of Laser Beam Printer

Figure 2:
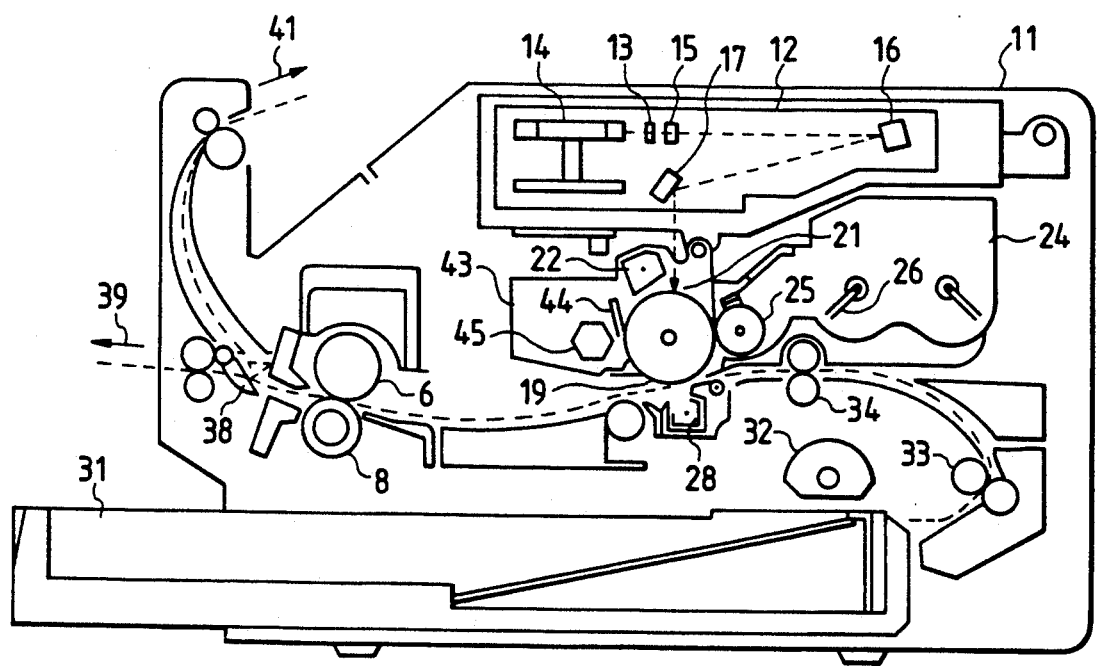

FIG. 2 shows schematically a laser beam printer as an example of image forming apparatus.

A laser beam printer 11 includes a laser scanner 12. The laser scanner 12 includes a semiconductor laser 13 that outputs a laser beam as modulated in accordance with an input image signal. The laser beam emitted from the semiconductor laser 13 is incident on a polygonal mirror 14 and deflected in proportion to the amount of its rotation. The deflected laser beam passes through an fθ lens 15, has its direction of travel changed by mirrors 16 and 17, and exits from the laser scanner 12.

A photoreceptor drum 19 rotating at a constant speed is positioned below the laser scanner 12. The laser beam emitted from the laser scanner 12 repeatedly scans a predetermined exposing position 21 on the photoreceptor drum 19 in its axial direction, that is, the main scan direction. A charge corotron 22 for charging uniformly the surface of the photoreceptor drum 19 is located a little ahead of the exposing position 21 in such a way as to face the photoreceptor drum 19. When the laser beam illuminates the charged photoreceptor drum 19, a latent electrostatic image corresponding to the input image information is formed on the drum surface. This latent electrostatic image is developed by means of a developing unit 24 in an area of the drum surface that is downstream of the exposing position. Included within the developing unit 24 are a developing roll 25 that aligns magnetized toner particles into bristles for developing the latent electrostatic image, a toner supply mechanism 26 for supplying the toner from a toner cartridge to the developing roll 25, and other necessary components. The developing unit 24 is applied with a predetermined development bias.

As the photoreceptor drum 19 rotates, the toner image formed by development in the developing unit 24 is transported to a position where it faces a transfer corotron 28 that permits the toner image to be transferred electrostatically onto a recording sheet (plain paper). Each of the charge corotron 22 and transfer corotron 28 used in the embodiment under discussion is composed of a single corotron wire that is connected between the ground and a terminal at which a charging voltage is applied.

The transport route of recording sheet will be briefly described below. A plurality of recording sheets (not shown) are adapted to be stacked in a cassette tray 31 detachably provided in the lower part of the laser beam printer 11. The topmost recording sheet is taken out of the tray by means of a roll 32 in the form of a segment of a disk. The roll 32 may be replaced by a retarding roll or some other suitable means.

The recording sheet taken out of the cassette tray 31 is guided by transport rolls 33 to travel in the route indicated by a broken line until it reaches the nipped position between registry rolls 34, where it stops for a while. Thereafter, an electromagnetic clutch (not shown) permits the registry rolls 34 to start rotating in synchronism with the rotation of the photoreceptor drum 19 so that the recording sheet starts to be transported at a constant speed and in a consistent way. Thus, the recording sheet passes between the photoreceptor drum 19 and the transfer corotron 28 at a desired timing. Only at that time does the transfer corotron 28 discharge, whereby the toner particles on the photoreceptor drum 19 are attracted electrostatically toward the transfer corotron 28, causing the toner image to be transferred onto the recording sheet. Any unwanted charges on the recording sheet carrying the transferred toner image are removed by means of an erasing stylus (not shown) that is provided downstream of the transfer corotron 28 and that is placed in contact with the back of the sheet. The recording sheet then separates from the drum surface and is relieved of its tension by being transported in a path of a predetermined length. Thereafter, the recording sheet is carried to a fusing unit composed of a heating roll 6 and a pressure roll 8. In the fusing unit, the recording sheet is passed through the nip of a predetermined width between the heating roll 6 and the pressure roll 8. In this instance, the side of the recording sheet that carries the transferred toner image faces the heating roll 6, and the pressure roll 8 which presses the recording sheet against the heating roll 6 enables efficient heat transfer to the toner image. The heating roll 6 is controlled at a constant elevated temperature so that the toner image on the recording sheet is permanently fused to its surface by heat.

Provided at the exit of the fusing unit is a directional valve 38 for changing the route in which the recording sheet is to be transported after fusing of the toner image. Depending on the position of this directional valve 38, the recording sheet will either travel straight to be ejected in the first direction 39 or make a U-turn to be ejected from the top of the laser beam printer 11 in the second direction 41 which is virtually opposite to the first direction 39. These two directions of ejection are made available so that the operator can choose whether the recording sheet is to be ejected with the recorded image facing up or down. If he selects the second direction 41 and permits the recording sheet to be ejected with the recorded image facing down, a plurality of sheets that have been printed on a page-by-page basis can be stapled together as they are arranged in the order of ejection.

The toner image that has not been transferred onto the recording sheet is removed from the drum surface by means of a cleaning unit 43 located further downstream of the transfer corotron 28. The cleaning unit 43 includes a blade 44 for wiping the toner particles off the drum surface and a rotor 45 that causes the toner deposit under the blade 44 to be displaced to a storage portion in a backward position.

Outline of Circuit Configuration

Figure 3:
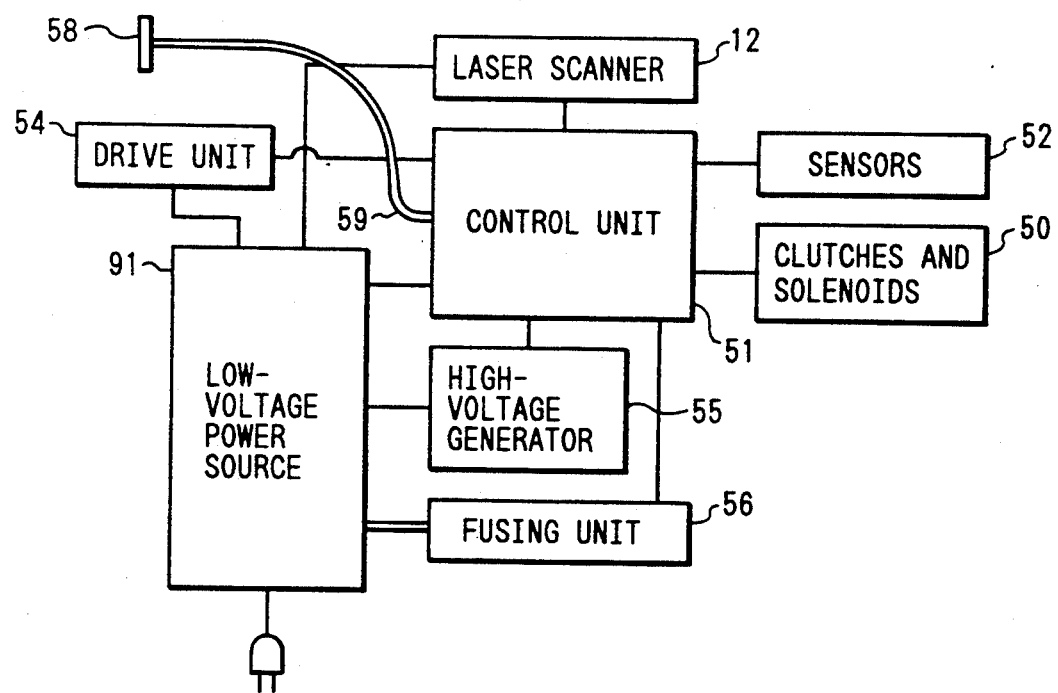

FIG. 3 shows an outline of the electric circuit portion of the laser beam printer under consideration. The laser beam printer 11 has a control unit 51 equipped with a CPU (central processing unit). As will be described hereinafter in detail, the control unit 51 performs control operations in accordance with the program written in a built-in read-only memory.

The control unit 51 is connected to various circuit components, such as sensors 52 for checking the status of transport of the recording sheet, a drive unit 54 including a main motor for driving mechanical parts in various sections of the printer, and various clutches and solenoids 50 for controlling the drive force transmitted from the drive unit 54. A high-voltage generator 55 for supplying high voltage to charge corotron 22 and transfer corotron 28, the fusing unit 56 including the heating roll 6 (FIG. 2) and the laser scanner 12 are also connected to the control unit 51 so that they are individually controlled by the unit 51. A cable 59 having a terminal connector 58 to an apparatus in a higher level of system hierarchy is also connected to the control unit 51 so as to establish communication with information processors such as a host computer.

The control unit 51 is adapted to be supplied with drive power from a low-voltage power source 91. The low-voltage power source 91 produces a voltage as stepped down from the voltage, say, 100 volts, of a commercial power supply (not shown) and its output is also supplied to the drive unit 54, high-voltage generator 55 and the fusing unit 56.

Figure 4:
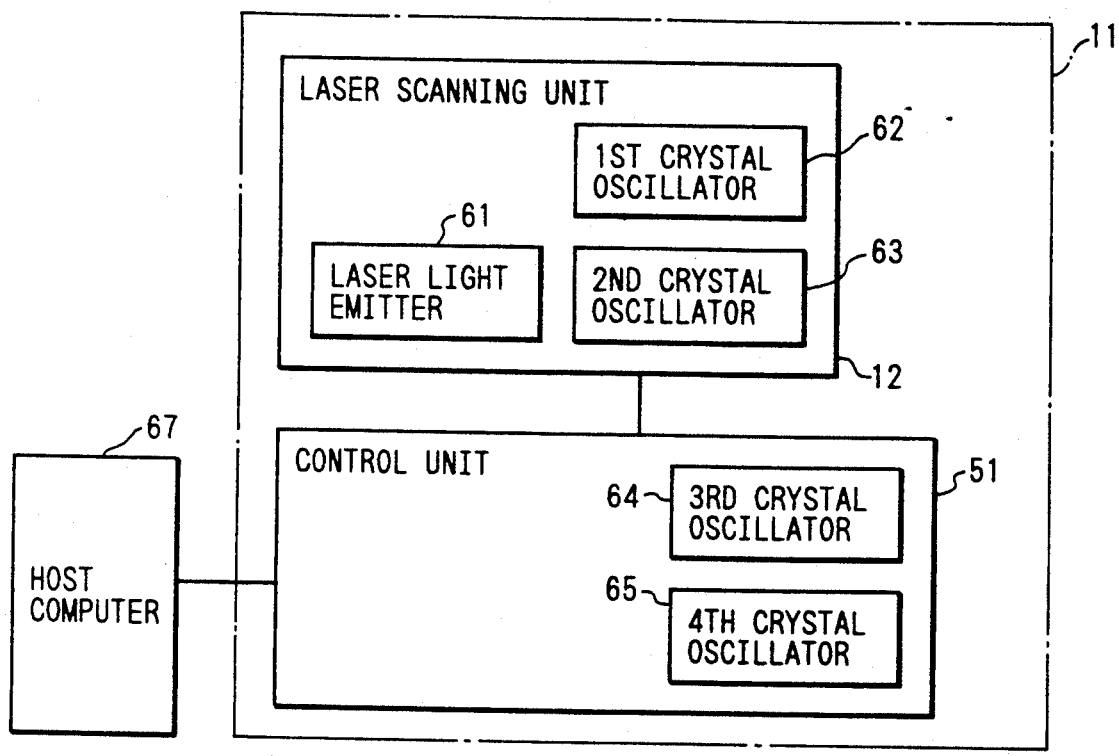
Figure 7:
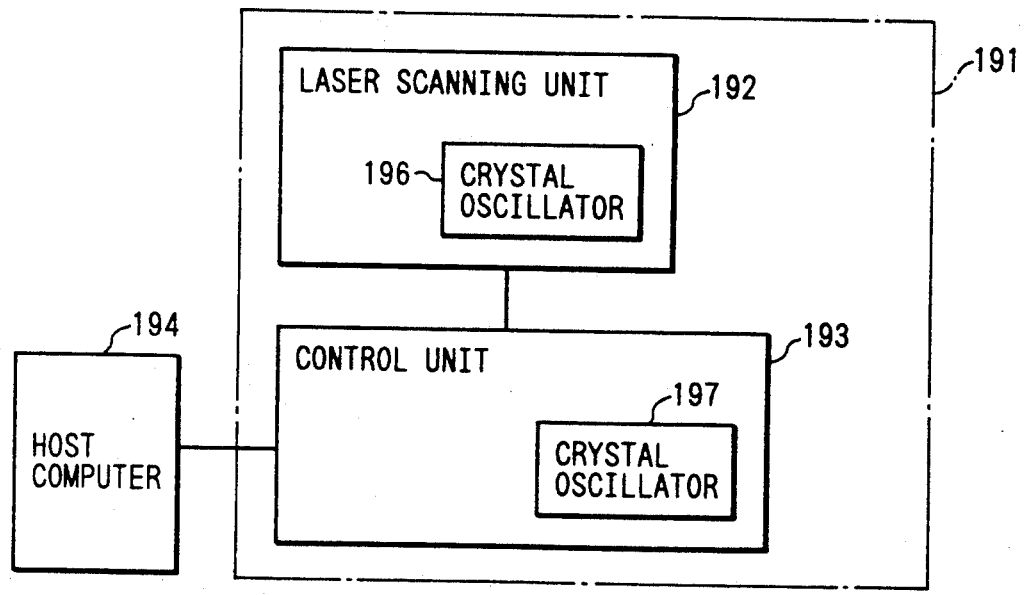
FIG. 7 is a block diagram showing an outline of a conventional laser beam printer as connected to a host computer.

FIG. 4 shows an outline of the laser beam printer under consideration which is connected to a host computer as in the case shown in FIG. 7. The laser beam printer 11 in the embodiment under discussion has a emitter 61, as well as a first and a second crystal oscillator 62 and 63 contained in the laser scanner 12 shown in FIG. 3. The emitter 61 is composed of an output-variable semiconductor laser. The control unit 51 which is connected to the laser scanner 12 has a third and a fourth crystal oscillators 64 and 65 therein. The first and third crystal oscillators 62 and 64 generate clock signals in association with a scanning density of 300 dpi, whereas the second and fourth crystal oscillators 63 and 65 generate clock signals in association with a scanning density of 400 dpi. The control unit 51 is adapted to be connected, via the connector 58 (FIG. 3), to the host computer 67 which supplies image information having two scanning densities of 300 dpi and 400 dpi.

Figure 1:
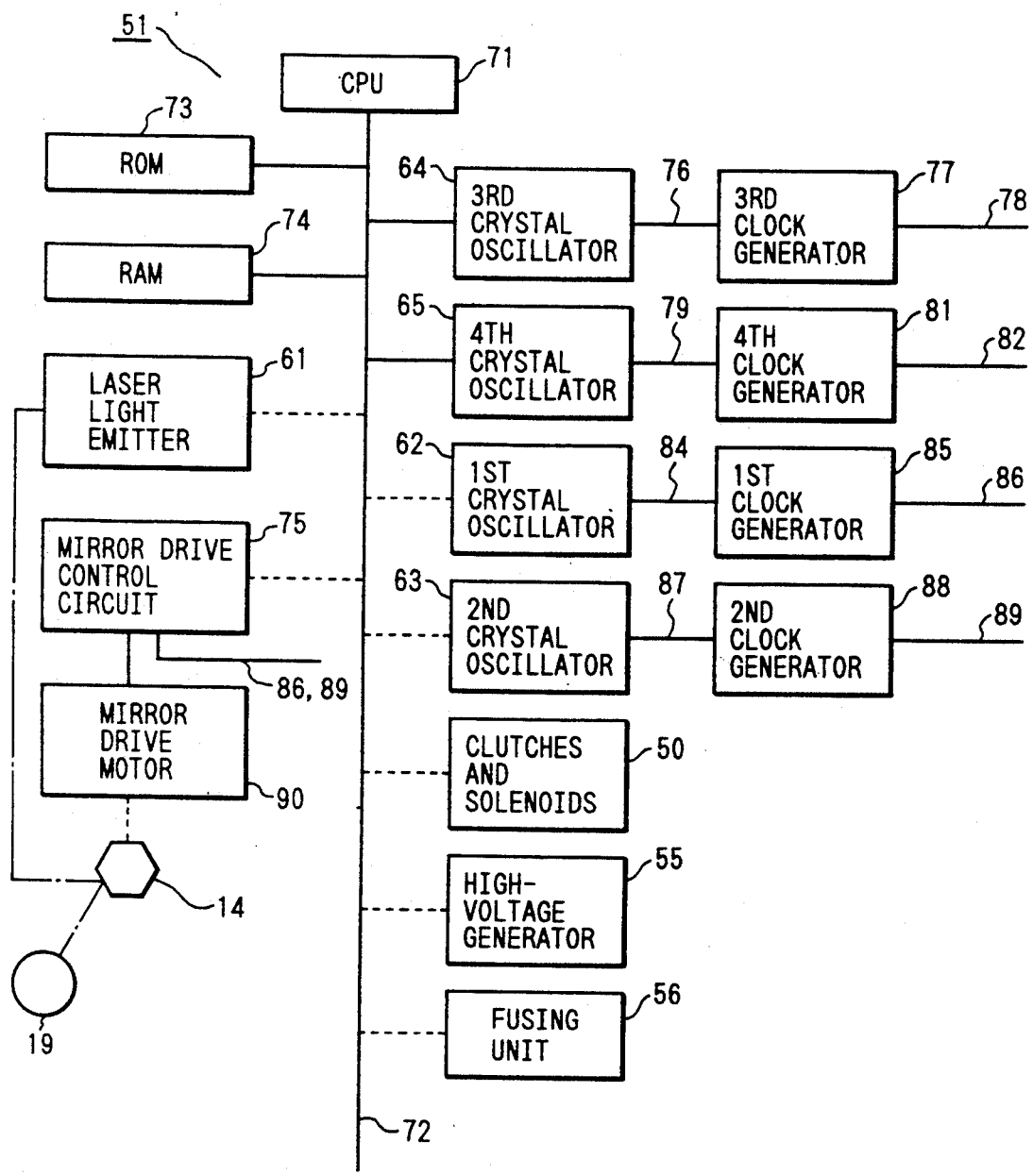

FIG. 1 shows the essential part, including the control unit, of the circuit configuration of the laser beam printer. The control unit 51 is equipped with a CPU (central processing unit) 71. The CPU 71 is connected, via a bus 72 such as a data bus, to ROM 73, RAM 74, the third crystal oscillator 64 and the fourth crystal oscillator 65. The CPU 71 is also connected to the emitter 61, the first crystal oscillator 62 and the second crystal oscillator 63 via a cable (shown by a broken line) connected to the laser scanner 12 (FIG. 4). Further, the control unit 51 is connected to a mirror drive control circuit 75 in the drive unit 54 (FIG. 3), as well as to the clutches and solenoids 50, the high-voltage generator 55 and the fusing unit 56 which are also shown in FIG. 3. The ROM 73 is a read-only memory having a program stored for performing various control operations on the laser beam printer. The RAM 74 is an operational memory composed of a random-access memory.

Referring to FIG. 1, a clock signal 76 generated from the third crystal oscillator 64 is supplied into a third clock generator 77, where it is frequency-divided by an appropriate ratio to construct a third clock signal 78 for transferring image data sent from the host computer at a scanning density of 300 dpi. A clock signal 79 generated from the fourth crystal oscillator 65 is supplied into a fourth clock generator 81, where it is frequency-divided by an appropriate ratio to construct a fourth clock signal 82 for transferring image data sent from the host computer at a scanning density of 400 dpi.

A clock signal 84 generated from the first crystal oscillator 62 is supplied into a first clock generator 85, where it is frequency-divided by an appropriate ratio and thence supplied as a first clock signal 86 to the mirror drive control circuit 75. When this first clock signal 86 is to be used as a control signal, the mirror drive control circuit 75 supplies a drive signal to a mirror drive motor 90 and permits it to control the rotation of the polygonal mirror 14 in such a way that laser beam can scan the surface of the photoreceptor drum 19 at a scanning density of 300 dpi. Similarly, a clock signal 87 generated from the second crystal oscillator 63 is supplied into a second clock generator 88, where it is frequency-divided by an appropriate ratio and thence supplied as a second clock signal 89 to the mirror drive control circuit 75. When this second clock signal 89 is to be used as a control signal, the mirror drive control circuit 75 supplies a drive signal to the mirror drive motor 90 and permits it to control the rotation of the polygonal mirror 14 in such a way that laser beam can scan the surface of the photoreceptor drum 19 at a scanning density of 400 dpi.

Scanning Density Changeover Control

Figure 5:
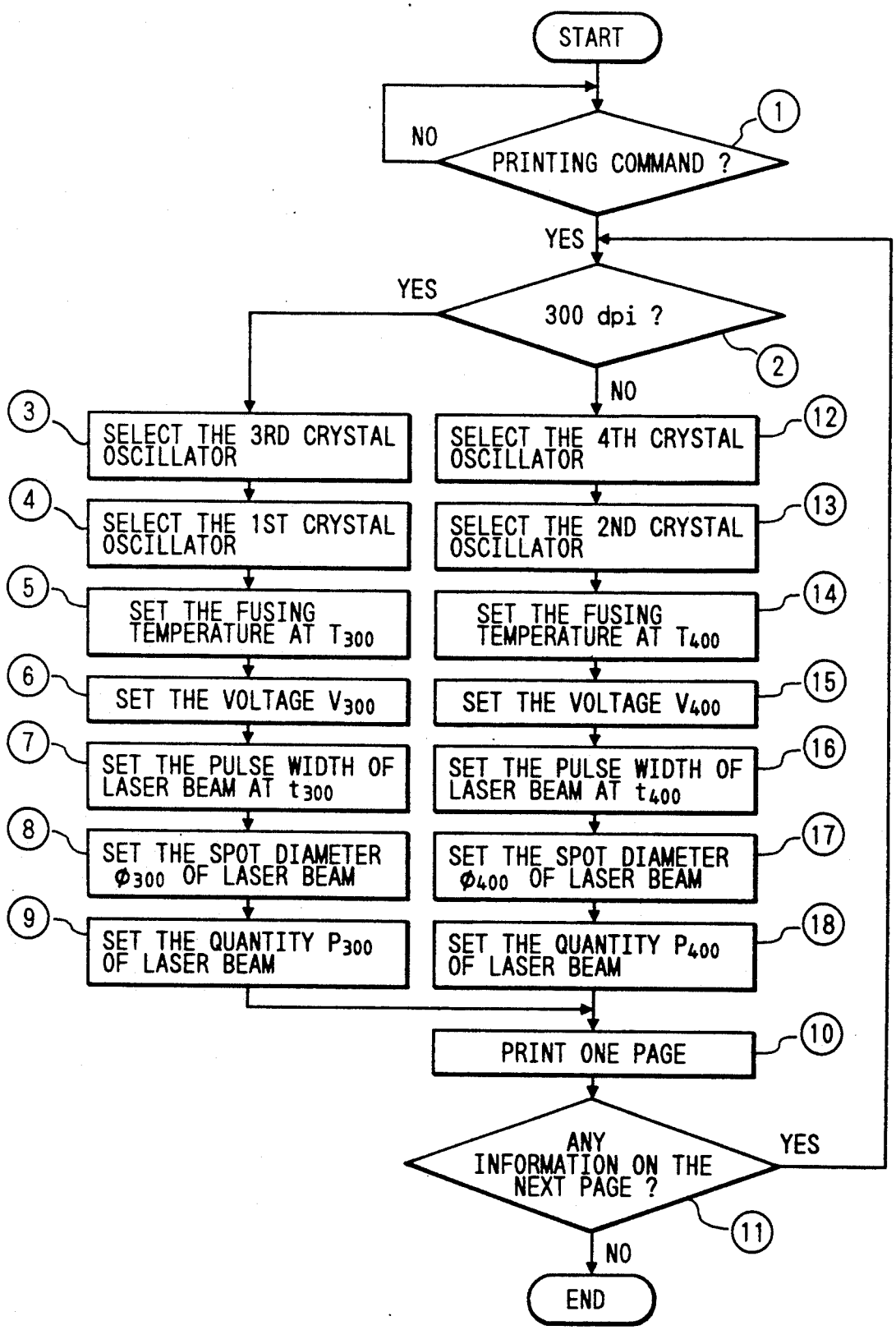

FIG. 5 illustrates how the printing operation of the laser beam printer in the embodiment is controlled. The host computer 67 connected to the laser beam printer sends image information of 300 dpi when text information is to be printed on a page of interest, and it sends image information of 400 dpi when picture information is to be printed on that page.

When power is supplied into the laser beam printer, CPU 71 checks if there is a printing command coming from the host computer 67 (step 1). If the answer is yes (Y), the CPU determines if the page of interest is to be printed at 300 dpi (step 2). If the answer is yes (Y), namely, if text information is to be printed on that page, the CPU 71 selects the third crystal oscillator 64 in the control unit 51, thereby selecting the third clock signal 78 for transfer of image data (step 3). Further, the CPU 71 sends a control signal to the laser scanner 12 so that it selects the first crystal oscillator 62, whereupon the first clock signal 86 is supplied to the mirror drive control circuit 75 (step 4). Subsequently, CPU 71 sends a temperature control signal to the fusing unit 56 so that the fusing temperature of the recording sheet is set at $T_{300}$ which is suitable for the scanning density of 300 dpi (step 5).

In the laser beam printer according to the embodiment under consideration, the photoreceptor drum 19 is adapted to rotate at the same speed whether the scanning density is 300 dpi or 400 dpi. However, $T_{300}$ which is the temperature setting for the scanning density of 300 dpi is slightly higher than $T_{400}$ which is the temperature setting for the scanning density of 400 dpi. This is because the deposit of toner particles per unit area is adjusted to be greater at the scanning density of 300 dpi than in the case of 400 dpi in the embodiment in order to insure that the diameter of dot for one pixel is larger at the scanning density of 300 dpi than in the case of 400 dpi. Specifically, the laser beam printer of the embodiment uses combinations of several techniques for increasing the spot diameter of the laser beam, or enhancing its quantity so that the spot diameter of the laser beam for the scanning density of 300 dpi increases gradually until, taken as a whole, it is proportionate to the spot diameter for the case of 400 dpi. Under these circumstances, it is necessary to increase the dot diameter for 300 dpi by permitting more toner particles to be deposited on the latent electrostatic image and, to this end, a higher fusing temperature is needed in the case of 300 dpi. Needless to say, $T_{300}$ may in principle be equal to $T_{400}$ if the laser beam incident on the surface of the photoreceptor drum 19 is preliminarily set at a large enough diameter to be reasonably compatible with the scanning density of 300 dpi.

For the same reason as described above, CPU 71 is so adapted that the voltage ($V_{300}$) supplied from the high-voltage source to the transfer corotron 28 during printing at 300 dpi is set at a higher value than the voltage $V_{400}$ which is applied during printing at 400 dpi (step 6). If $V_{300}$ is higher than $V_{400}$, not only the peak but also the tails of a generally bell-shaped toner particle will be transferred onto the recording sheet, thereby producing broader dots in the print.

Subsequently, CPU 71 sends a control signal to the laser scanner 12 and sets the pulse width of laser beam at $t_{300}$ for 300 dpi (step 7). The relationship between $t_{300}$ and $t_{400}$ which is the pulse width setting for 400 dpi will be described later in this specification. In a similar way, CPU 71 sets $\phi_{300}$ and $P_{300}$ which are the spot diameter and quantity, respectively, of laser beam for 300 dpi (steps 8 and 9). The setting of $\phi_{300}$ (the spot diameter of laser beam) is accomplished by operating the solenoid 50 in such a way as to select the width of a slit (not shown) in the optical path of laser beam which is associated with the scanning density of 300 dpi. The setting of $P_{300}$ (the quantity of laser beam) is performed by increasing the output of the laser light emitter 61 over the output for 400 dpi by a predetermined amount.

Figure 6:
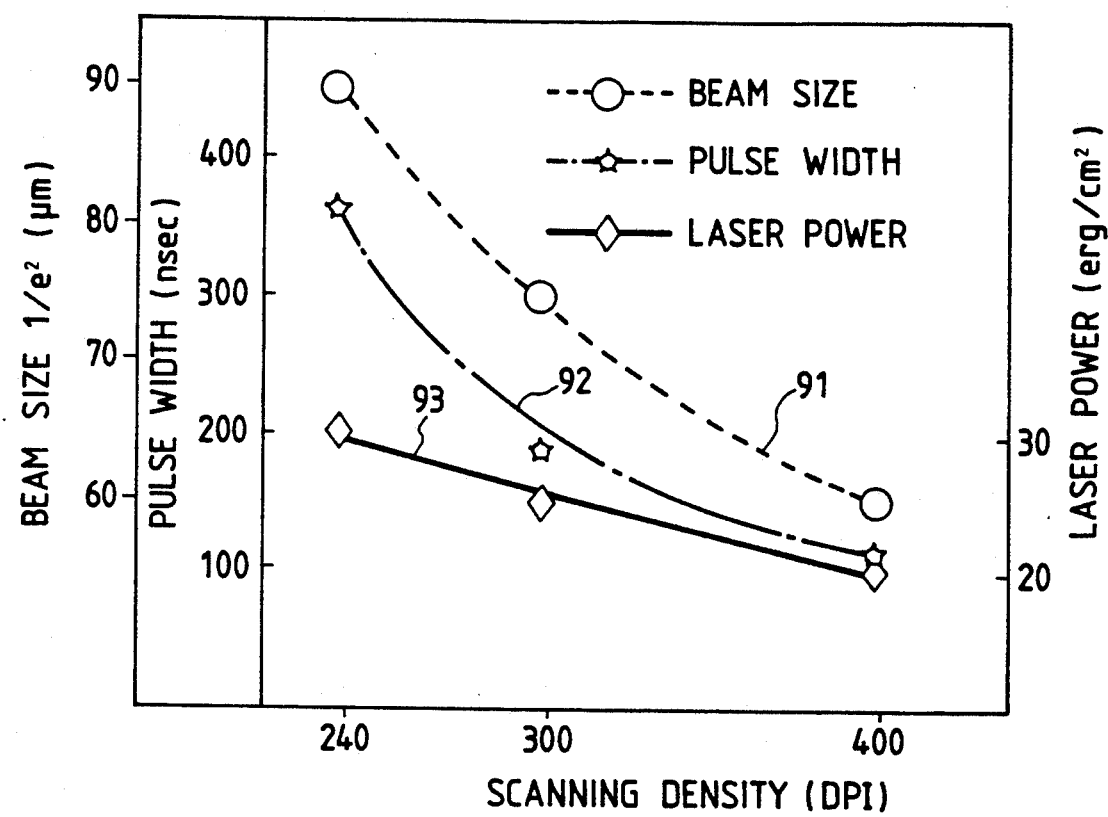

FIG. 6 shows the relationship between scanning density and various laser parameters. Curve 91 depicts the relationship between the spot diameter of laser beam (beam size) and the scanning density; curve 92 depicts the relationship between the pulse width of laser beam and the scanning density; and curve 93 depicts the relationship between the quantity of laser beam (laser power) and the scanning density. As FIG. 6 shows, text information can be printed to produce an image of optimum quality if those three parameters are set at values appropriate for the scanning density of 300 dpi. In the case of printing at the scanning density of 400 dpi which will be described hereinafter, those laser parameters are set at values appropriate for 400 dpi and then picture information can be printed to produce an image of optimum quality.

With the respective laser parameters set in the manner described above, the laser beam printer executes printing of one page at the scanning density of 300 dpi (step 10). Specifically, the surface of the photoreceptor drum 19 is scanned at 300 dots per inch in both the main and subsidiary scan directions as it is irradiated with a laser beam that is comparatively thicker than in the case where printing is done at 400 dpi. The resulting latent electrostatic image is developed with toner particles to form a toner image, which is transferred onto the recording sheet by means of the transfer corotron 28 and fused permanently on the sheet in the fusing unit 56. The recording sheet carrying the fused toner image is then ejected from the printer.

In the process of printing just described above, CPU 71 determines if there is any information to be printed on the next page (step 11). If the answer is no (N), CPU 71 ends the printing operation. If there is information to be printed on the next page (Y), CPU 71 returns to step 2 and determines if the next page to be printed is for 300 dpi. If the answer is yes (Y), CPU 71 will repeat the sequence of control operations already described above (steps 3 through 10). If the next page to be printed is for 400 dpi (N in step 2), CPU 71 performs the following control operations.

Since picture information is to be printed on the next page, CPU 71 selects the fourth crystal oscillator 65 in the control unit 51, thereby selecting the fourth clock signal 82 for transfer of image data (step 12). Further, CPU 71 sends a control signal to the laser scanner 12 so that it selects the second crystal oscillator 63, whereupon the second clock signal 89 is supplied to the mirror drive control circuit 75 (step 13). Subsequently, CPU 71 sends a temperature control signal to the fusing unit 56 so that the fusing temperature of the recording sheet is set at $T_{400}$ which is suitable for the scanning density of 400 dpi (step 14).

In the next step, CPU 71 sets $V_{400}$ (the voltage supplied from the high-voltage source to transfer corotron 28 during printing at 400 dpi) at a lower value than $V_{300}$ which is applied during printing at 300 dpi (step 15). Further, CPU 71 sends a control signal to the laser scanner 12 and sets the pulse width of laser beam at $t_{400}$ for 400 dpi (step 16). In a similar way, CPU 71 sets $\phi_{400}$ and $P_{400}$ which are the spot diameter and quantity, respectively, of laser beam for 400 dpi (steps 17 and 18). The setting of $\phi_{400}$ (the spot diameter of laser beam) is accomplished by operating the solenoid 50 in such a way as to select the width of the slit (not shown) in the optical path of laser beam which is associated with the scanning density of 400 dpi. The setting $P_{400}$ (the quantity of laser beam) is performed by reducing the output of the laser light emitter 61 compared to the output for 300 dpi by a predetermined amount.

With the respective laser parameters set in the manner described above, the laser beam printer executes printing of one page at the scanning density of 400 dpi (step 10). If there is no information to be printed on the next page (N in step 11), CPU 71 ends the printing operation. Otherwise (Y in step 11), CPU 71 returns to step 2 and repeats the sequence of control operations already described above (steps 3 through 18).

In the laser beam printer according to the embodiment described above, five parameters (i) the fusing temperature provided by the fusing unit 56, (ii) the voltage applied from the high-voltage source to the transfer corotron 28, (iii) the pulse width of the laser beam, (iv) the spot diameter of the laser beam, and (v) the quantity of the laser beam, are changed or selectively switched in accordance with a desired scanning density.

It should, however, be noted that there is no need to change all of those five parameters, and the scanning density can be changed within two or more values by changing any parameters less than five. For instance, a plurality of values for scanning density can be set by merely changing the pulse width and spot diameter of laser beam. Needless to say, it is also effective to change the scanning density by changing any parameters more than five. In place of changing the voltage applied to the transfer corotron 28, the voltage applied to the charge corotron 22 may be changed and this is also effective for the purpose of changing the scanning density or the contrast in static charges. The spot diameter of the laser beam can also effectively be changed by adjusting the development bias on the developing unit 24. Further, the contrast in static charges can be adjusted to an optimum value for each of the scanning densities to be selected.

In the embodiment described above, the scanning density in the subsidiary scan direction (i.e., the scanning density in the rotational direction of the photoreceptor drum 19) is altered by changing the frequency of scan cycles (the number of scanning lines) per unit time, with the drum 19 rotating at a constant speed. Alternatively, the scanning density in the subsidiary scan direction may be altered by changing the rotational speed of the photoreceptor drum 19. In the embodiment, the temperature in the fusing unit 56 is adjusted only from the viewpoint of fusing toner but, if desired, the temperature in an oven-type fusing unit may be changed or the heating roll 6 may be switched to an oven-type fusing unit or vice versa, or some other method may be used to change the size of toner particles during fusing, thereby achieving a change or switch in the scanning density. In the embodiment, in accordance with the change of the scanning density, the discharge current is altered by changing the voltage to be applied to the single-wired corotron but this is not the sole case of the present invention. If desired, a scorotron having a grid of control wires provided ahead of the corotron wire may be used and the voltage applied to the control wires may be controlled in order to adjust the discharge current within several values.

In the embodiment, the control unit 51 and the laser scanner 12 are furnished with four crystal oscillators 62 through 65 in association with the two scanning densities (300 dpi and 400 dpi). Needless to say, a smaller number of crystal oscillators will suffice if the ratio of frequency division to be performed on clock signals from those crystal oscillators is properly adjusted to obtain clock signals that correspond to the desired scanning density.

As described on the foregoing pages, the laser beam printer of the present invention permits the scanning density to be changed or selectively switched within a plurality of values in accordance with image data being sent from a host computer or other information processors, whereby image data having a plurality of scanning densities can be handled with a single unit of printer. Not only does this contribute to an economical and efficient use of the laser beam printer but it is also effective in reducing the installation space of the printer. A further advantage of the present invention is that if the laser beam printer is connected to a local area network such as Ethernet, image data provided from various work stations can be printed with a common printer.

What is claimed is:

1. A laser beam printer comprising:
a photoreceptor;
latent image forming means for forming a latent electrostatic image on said photoreceptor by irradiating a laser beam on said photoreceptor;
developing means for developing the latent electrostatic image on said photoreceptor to form a resulting toner image;
transfer means for transferring the resulting toner image onto a sheet to form a transferred toner image on said sheet;
transfer charging means for charging said transfer means at a time of transferring said resulting toner image onto said sheet;
fusing means for fusing the transferred toner image on the sheet to produce a print;
scanning density switching means for selectively switching a scanning density of the laser beam on said photoreceptor within a range of values;
transfer charge voltage switching means for selectively switching a transfer charge voltage generated by said transfer charging means within a range of values; and
control means for controlling a switching operation of said transfer charge voltage switching means in accordance with a value of the scanning density selected by said scanning density switching means.

2. The laser beam printer according to claim 1, further comprising:
laser power switching means for selectively switching a laser power of the laser beam within a range of values;
wherein said control means controls a switching operation of said laser power switching means in accordance with a value of the scanning density selected by said scanning density switching means.

3. The laser beam printer according to claim 1, further comprising:
beam width switching means for selectively switching a width of the laser beam for one pixel in a main scan direction within a range of values;
wherein said control means controls a switching operation of said beam width switching means in accordance with a value of the scanning density selected by said scanning density switching means.

4. The laser beam printer according to claim 1, further comprising:
beam width switching means for selectively switching a width of the laser beam for one pixel in a subsidiary scan direction within a range of values;
wherein said control means controls a switching operation of said beam width switching means in accordance with a value of the scanning density selected by said scanning density switching means.

5. The laser beam printer according to claim 1, further comprising:
development bias switching means for selectively switching a setting value of a development bias on said developing means within a range of values;
wherein said control means controls a switching operation of said development bias switching means in accordance with a value of the scanning density selected by said scanning density switching means.

6. The laser beam printer according to claim 1, further comprising:
charging means for charging said photoreceptor at a time of forming the latent electrostatic image;
charge voltage switching means for selectively switching a charge voltage generated from said charging means within a range of values;
wherein said control means controls a switching operation of said charge voltage switching means in accordance with a value of the scanning density selected by said scanning density switching means.

7. The laser beam printer according to claim 1, further comprising:
fusing temperature switching means for selectively switching a fusing temperature of said fusing means within a range of values;

wherein said control means controls a switching operation of said fusing temperature switching means in accordance with a value of the scanning density selected by said scanning density switching means.

8. The laser beam printer according to claim 1, further comprising:

moving speed switching means for selectively switching a speed of relative movement of said photoreceptor to the laser beam in a direction substantially perpendicular to a scan direction of said laser beam within a range of values;

wherein said control means controls a switching operation of said moving speed switching means in accordance with a value of the scanning density selected by said scanning density switching means.

9. A laser beam printer comprising:

a photoreceptor;

latent image forming means for forming a latent electrostatic image on said photoreceptor by irradiating a laser beam on said photoreceptor;

developing means for developing the latent electrostatic image on said photoreceptor to form a resulting toner image;

transfer means for transferring the resulting toner image onto a sheet to form a transferred toner image on said sheet;

fusing means for fusing the transferred toner image on the sheet to produce a print;

scanning density switching means for selectively switching a scanning density of the laser beam on said photoreceptor within a range of values;

fusing temperature switching means for selectively switching a fusing temperature of said fusing means within a range of values; and control means for controlling a switching operation of said fusing temperature switching means in accordance with a value of the scanning density selected by said scanning density switching means.

10. A laser beam printer comprising:

a photoreceptor;

latent image forming means for forming a latent electrostatic image on said photoreceptor by irradiating a laser beam on said photoreceptor;

developing means for developing the latent electrostatic image on said photoreceptor to form a resulting toner image;

transfer means for transferring the resulting toner image onto a sheet to form a transferred toner image on said sheet;

fusing means for fusing the transferred toner image on the sheet to produce a print;

scanning density switching means for selectively switching a scanning density of the laser beam on said photoreceptor within a range of values;

development bias switching means for selectively switching a setting value of a development bias on said developing means within a range of values; and control means for controlling a switching operation of said development bias switching means in accordance with a value of the scanning density selected by said scanning density switching means.

11. A laser beam printer comprising:

a photoreceptor;

latent image forming means for forming a latent electrostatic image on said photoreceptor by irradiating a laser beam on said photoreceptor;

charging means for charging said photoreceptor at a time of forming the latent electrostatic image;

developing means for developing the latent electrostatic image on said photoreceptor to form a resulting toner image;

transfer means for transferring the resulting toner image onto a sheet to form a transferred toner image on said sheet;

fusing means for fusing the transferred toner image on the sheet to produce a print;

scanning density switching means for selectively switching a scanning density of the laser beam on said photoreceptor within a range of values;

charge voltage switching means for selectively switching a charge voltage generated from said charging means within a range of values; and control means for controlling a switching operation of said charge voltage switching means in accordance with a value of the scanning density selected by said scanning density switching means.

* * * * *